(12) United States Patent
Bedenbaugh et al.

(10) Patent No.: US 10,694,720 B2
(45) Date of Patent: Jun. 30, 2020

(54) THERAPEUTIC GARMENT FOR ANIMALS

(71) Applicant: K9 ALIGN, INC., Irvine, CA (US)

(72) Inventors: Lisa Gay Bedenbaugh, Monroe, GA (US); William J. Schultz, Newport Beach, CA (US)

(73) Assignee: K9 Align, Inc., Newport Beach, CA (US)

( * ) Notice: Subject to any disclaimer, the term of this patent is extended or adjusted under 35 U.S.C. 154(b) by 225 days.

(21) Appl. No.: 15/984,260

(22) Filed: May 18, 2018

(65) Prior Publication Data

US 2018/0332821 A1 Nov. 22, 2018

Related U.S. Application Data

(60) Provisional application No. 62/508,767, filed on May 19, 2017.

(51) Int. Cl.
  *A01K 13/00* (2006.01)
  *A61D 3/00* (2006.01)
  *A61D 9/00* (2006.01)

(52) U.S. Cl.
  CPC .............. *A01K 13/006* (2013.01); *A61D 3/00* (2013.01); *A61D 9/00* (2013.01)

(58) Field of Classification Search
  CPC .............................. A01K 13/00; A01K 13/006

(Continued)

(56) References Cited

U.S. PATENT DOCUMENTS 6,138,611 A * 10/2000 Thielemann ......... A01K 13/006
                                                    119/850
7,516,498 B2    4/2009 Torry
(Continued)

FOREIGN PATENT DOCUMENTS

DE       202006016059 U1    3/2007
GB           2474283 A      4/2011
(Continued)

OTHER PUBLICATIONS

International Search Report and Written Opinion issued in corresponding International Application No. PCT/US2018/033531, dated Oct. 2, 2018, 2 pages.

(Continued)

*Primary Examiner* — Richard T Price, Jr.
(74) *Attorney, Agent, or Firm* — Lewis Roca Rothgerber Christie LLP

(57) ABSTRACT

A therapeutic garment for an animal includes body portion, first and second leg straps extending caudally from a caudal end of the body portion, a chest plate portion extending cranially from a cranial end of the body portion, an opening defined at the cranial end of the body portion configured to accommodate a head of the animal, first and second ventral elastic straps connected to an exterior surface of the chest plate portion, first and second dorsal elastic straps connected to an exterior surface of the body portion, and at least one rear fastener proximate to the caudal end of the body portion. The first and second leg straps, the first and second ventral elastic straps, and the first and second dorsal elastic straps are each configured to be detachably connected to the at least one fastener proximate to the caudal end of the body portion.

20 Claims, 4 Drawing Sheets

(58) Field of Classification Search
USPC ............ 119/850, 856, 858, 863, 907; 54/79.1–79.4
See application file for complete search history.

(56) References Cited

U.S. PATENT DOCUMENTS

| | | | |
|---|---|---|---|
| 7,861,319 B2 | 1/2011 | Torry | |
| 7,871,388 B2 | 1/2011 | Brown | |
| 8,048,014 B2 | 11/2011 | Brown | |
| 8,214,926 B2 | 7/2012 | Brown | |
| 8,561,577 B1 * | 10/2013 | Paxton | A01K 27/002 |
| | | | 119/792 |
| 8,905,956 B2 | 12/2014 | Waeger | |
| 9,050,179 B2 | 6/2015 | Brown | |
| 9,119,707 B2 | 9/2015 | Brown | |
| 9,125,442 B2 | 9/2015 | Brown | |
| 9,168,167 B2 | 10/2015 | Brown | |
| D746,552 S | 1/2016 | Brown | |
| 9,332,734 B1 | 5/2016 | Hege | |
| 9,414,954 B2 | 8/2016 | Brown | |
| 9,452,078 B2 | 9/2016 | Waeger | |
| D780,406 S | 3/2017 | Brown | |
| D798,027 S | 9/2017 | Brown | |
| 9,883,703 B2 | 2/2018 | Schultz | |
| D816,300 S | 5/2018 | Brown | |
| D817,600 S | 5/2018 | Brown | |
| 2004/0244725 A1 | 12/2004 | Hartman et al. | |
| 2005/0240134 A1 | 10/2005 | Brown | |
| 2009/0062704 A1 | 3/2009 | Brown et al. | |
| 2009/0320180 A1 | 12/2009 | Torry | |
| 2010/0043725 A1 * | 2/2010 | Hall | A01K 13/006 |
| | | | 119/850 |
| 2011/0213283 A1 | 9/2011 | Brown | |
| 2011/0226193 A1 * | 9/2011 | Williams | A01K 23/00 |
| | | | 119/850 |
| 2011/0271415 A1 | 11/2011 | Torry | |
| 2012/0024239 A1 * | 2/2012 | Forbes | A01K 1/0263 |
| | | | 119/850 |
| 2013/0042820 A1 | 2/2013 | Blizzard | |
| 2014/0196190 A1 | 7/2014 | Brown | |
| 2015/0040286 A1 | 2/2015 | Schultz et al. | |
| 2017/0246068 A1 | 8/2017 | Schultz et al. | |
| 2017/0246071 A1 | 8/2017 | Schultz et al. | |
| 2018/0132543 A1 | 5/2018 | Schultz | |

FOREIGN PATENT DOCUMENTS

| | | |
|---|---|---|
| JP | 2010104418 A | 5/2010 |
| WO | WO 99/46118 | 9/1999 |

OTHER PUBLICATIONS

Animal Ortho Care, https://animalorthocare.com/, 4 pages.
Deluxe Therapeutic and Anxiety Rear Dog Wrap, https://keepdoggiesafe.com/products/therapeutic-post-surgery-dog-wrap-diaper, 3 pages.
Mobility Braces for Active Dogs, https://orthodog.com/, 5 pages.

* cited by examiner

THERAPEUTIC GARMENT FOR ANIMALS

CROSS-REFERENCE TO RELATED APPLICATION(S)

The present application claims priority to and the benefit of U.S. Provisional Application No. 62/508,767, filed May 19, 2017, the entire content of which is incorporated herein by reference.

FIELD

The present disclosure relates generally to therapeutic garments for animals.

BACKGROUND

Hip dysplasia is a condition in which there is abnormal development of the coxofemoral joint (i.e., the hip joint), which includes a femoral head (i.e., a ball) and an acetabulum (i.e., a socket). It is estimated that up to 20% of all canines suffer from some degree of hip dysplasia. Hip dysplasia causes poor congruency between the surfaces of the femoral head and the acetabulum, which leads to increased movement between the femoral head and the acetabulum and increased friction as the animal moves the coxofemoral joint. Over time, the increased friction in the coxofemoral joint leads to pain and inflammation in the hip, which in turn leads to decreased activity, muscle atrophy, thinning of the articular cartilage, and irritation of the surrounding soft tissue.

Static stability of the coxofemoral joint is provided by the femoral head sitting partially in the acetabulum, the labrum of the acetabulum, which covers a dorsal portion of the femoral head, and a ligament that extends between the medial side of the femoral head and the acetabulum. Fibrous tissue in the coxofemoral joint also aids in providing static stability.

In a healthy coxofemoral joint, approximately 50% of the femoral head is covered by the acetabulum. In contrast, in an animal with hip dysplasia, the dorsal lip of the acetabulum does not adequately cover the femoral head such that significantly less than 50% of the femoral head may be covered by the acetabulum. In extreme cases, the femoral head may luxate (i.e., dislocate) dorsally over the rim of the acetabulum as the animal stands up or walks.

Additionally, in a healthy animal, the animal's muscles around the coxofemoral joint, such as the gluteal muscles, the iliopsoas, the gemelli, the quadratus femoris, and the internal and external obturator muscles, aid in keeping the femoral head firmly seated in the acetabulum. In contrast, in an unhealthy animal suffering from hip dysplasia, the chronic pain associated with hip dysplasia can inhibit muscular action and can lead to atrophy of the muscles that help seat the femoral head in the acetabulum.

Related art methods for treating hip dysplasia include medications/supplements, rehabilitation therapy, surgical correction, and/or braces. However, medications and supplements are costly and can cause negative side effects on the animal's liver and kidneys when used for an extended period of time. Related art surgeries are expensive, require a period of restricted activity to permit proper healing, and can result in serious complications, such as infections and, in the case of a total hip replacement, loosening of the hardware or subluxation of the prosthetic hip. Additionally, related art hip braces artificially restrict movement around the hip joint, which can cause further atrophy of the muscles that aid in seating the femoral head in the acetabulum.

SUMMARY

The present disclosure is directed to various embodiments of a therapeutic garment for the treatment of hip dysplasia. In one embodiment, the therapeutic garment includes a body portion having a cranial end and a caudal end opposite the cranial end, first and second leg straps extending caudally from the caudal end of the body portion, a chest plate portion extending cranially from the cranial end of the body portion, an opening defined at the cranial end of the body portion configured to accommodate a head of the animal, first and second ventral elastic straps connected to an exterior surface of the chest plate portion, first and second dorsal elastic straps connected to an exterior surface of the body portion, and at least one rear fastener proximate to the caudal end of the body portion. The first and second leg straps, the first and second ventral elastic straps, and the first and second dorsal elastic straps are each configured to be detachably connected to the at least one fastener proximate to the caudal end of the body portion.

The body portion, the chest plate portion, and the first and second leg straps may each have a first resiliency, and each of the first and second dorsal elastic straps and the first and second ventral elastic straps may have at least a second resiliency greater than the first resiliency.

The therapeutic garment may include a series of discrete nonslip pads connected to an interior surface of the therapeutic garment.

The series of discrete nonslip pads may include a first nonslip pad, connected to an interior surface of the chest plate portion, a second nonslip pad, connected to an interior surface of the body portion proximate to the cranial end, a third nonslip pad, connected to the interior surface of the body portion proximate to the caudal end, and fourth and fifth nonslip pads, connected to respective interior surfaces of the first and second leg straps.

At least one nonslip pad of the series of discrete nonslip pads may include a composite of an open-celled, elastomeric foam and a fabric.

The at least one fastener may include a pad of hook-type fasteners or a pad of loop-type fasteners, and each of the first and second leg straps, the first and second ventral elastic straps, and the first and second dorsal elastic straps may include a corresponding pad of loop-type fasteners or a corresponding pad of hook-type fasteners.

The first and second dorsal elastic straps may extend toward contralateral sides of the body portion.

The first and second dorsal elastic straps may cross each other.

The therapeutic garment may include first and second fabric tunnels connected to the exterior surface of the body portion. The first and second fabric tunnels guide respective cranial ends of the first and second dorsal elastic straps.

The chest plate portion may include a pair of opposing flaps.

The therapeutic garment may also include first and second fasteners at first and second lateral sides of the exterior surface of the body portion. The pair of opposing flaps of the chest plate portion are configured to be detachably connected to the first and second fasteners.

The body portion and the chest plate portion may each include an omni-directional resilient and elastic fabric.

The therapeutic garment may also include an elastic binding coupled to a periphery of the body portion, the chest plate portion, and the leg straps.

The present disclosure is also directed to various method of providing therapeutic support to a canine having hip dysplasia. In one embodiment, the method includes attaching a therapeutic garment to the canine. The therapeutic garment includes a body portion, first and second leg straps extending from a caudal end of the body portion, a chest plate portion extending from a cranial end of the body portion, first and second ventral elastic straps connected to an exterior surface of the chest plate portion, first and second dorsal elastic straps connected to an exterior surface of the body portion, and at least one rear fastener proximate to the caudal end of the body portion. The method also includes supplying a dorsally and medially-directed force on the canine from each of the first and second dorsal elastic straps, and supplying a ventrally and medially-directed force on the canine from each of the first and second ventral elastic straps.

Attaching the therapeutic garment to the canine may include slipping the therapeutic garment over a head of the canine, attaching the chest plate portion to the body portion such that the chest plate portion covers at least a portion of a thorax of the canine, attaching the first and second dorsal elastic straps to contralateral sides of the at least one rear fastener, attaching the first and second ventral elastic straps to the at least one rear fastener and, wrapping the first and second leg straps around respective rear legs of the canine and attaching the first and second leg straps to the at least one rear fastener.

The dorsally and medially-directed force supplied by each of the first and second elastic straps may be substantially balanced by the ventrally and medially-directed force supplied by each of the first and second ventral elastic straps.

The method may also include providing a substantially symmetric and substantially uniform pressure on the canine from a resilient and elastic fabric of the body portion and the chest plate portion.

The method may also include holding the therapeutic garment in a desired anatomical position on the canine with a series of discrete nonslip pads connected to an interior surface of the therapeutic garment.

The present disclosure is also directed to a therapeutic garment for an animal including a body portion having a cranial end and a caudal end opposite the cranial end, first and second leg straps extending caudally from the caudal end of the body portion, a chest plate portion extending cranially from the cranial end of the body portion that is configured to be detachably connected to the body portion, an opening defined at the cranial end of the body portion configured to accommodate a head of the animal, and a series of discrete nonslip pads connected to an interior surface of the therapeutic garment. The body portion and the chest plate portion are each configured to create a first amount of friction against the animal, and at least one nonslip pad of the series of nonslip pads is configured to create a second amount of friction against the animal greater than the first amount of friction.

The series of discrete nonslip pads may include a first nonslip pad, connected to an interior surface of the chest plate portion, a second nonslip pad, connected to an interior surface of the body portion proximate to the cranial end, a third nonslip pad, connected to the interior surface of the body portion proximate to the caudal end, and fourth and fifth nonslip pads, connected to respective interior surfaces of the first and second leg straps.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a therapeutic garment for animals. The therapeutic garments of the present disclosure may be utilized to treat, for example, canines with hip dysplasia or other impairments involving the hip joint that result in weakness and/or mobility issues.

Figure 1A:
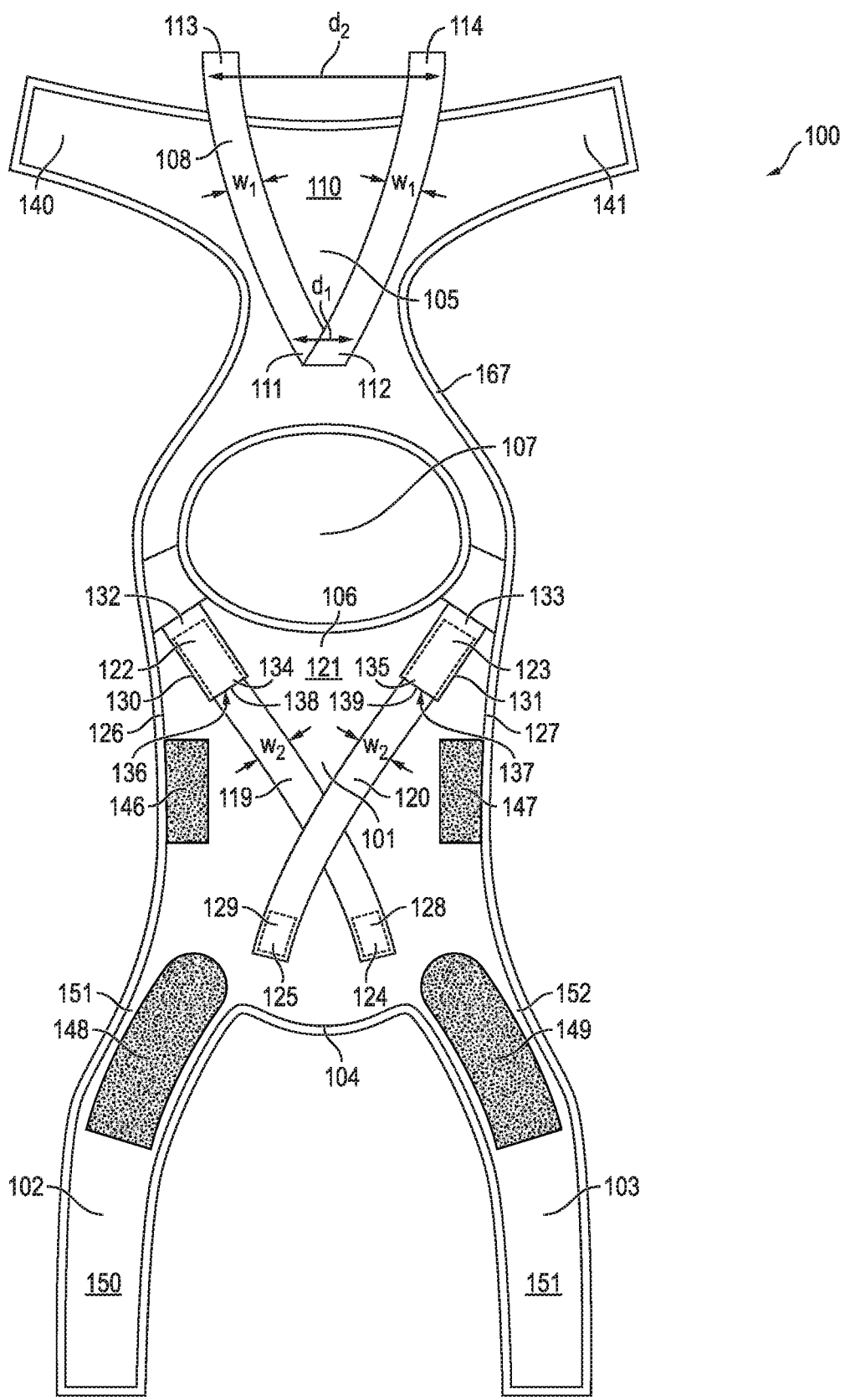
FIGS. 1A-1B are a top view and a bottom view, respectively, of a therapeutic garment according to one embodiment of the present disclosure.
Figure 1B:
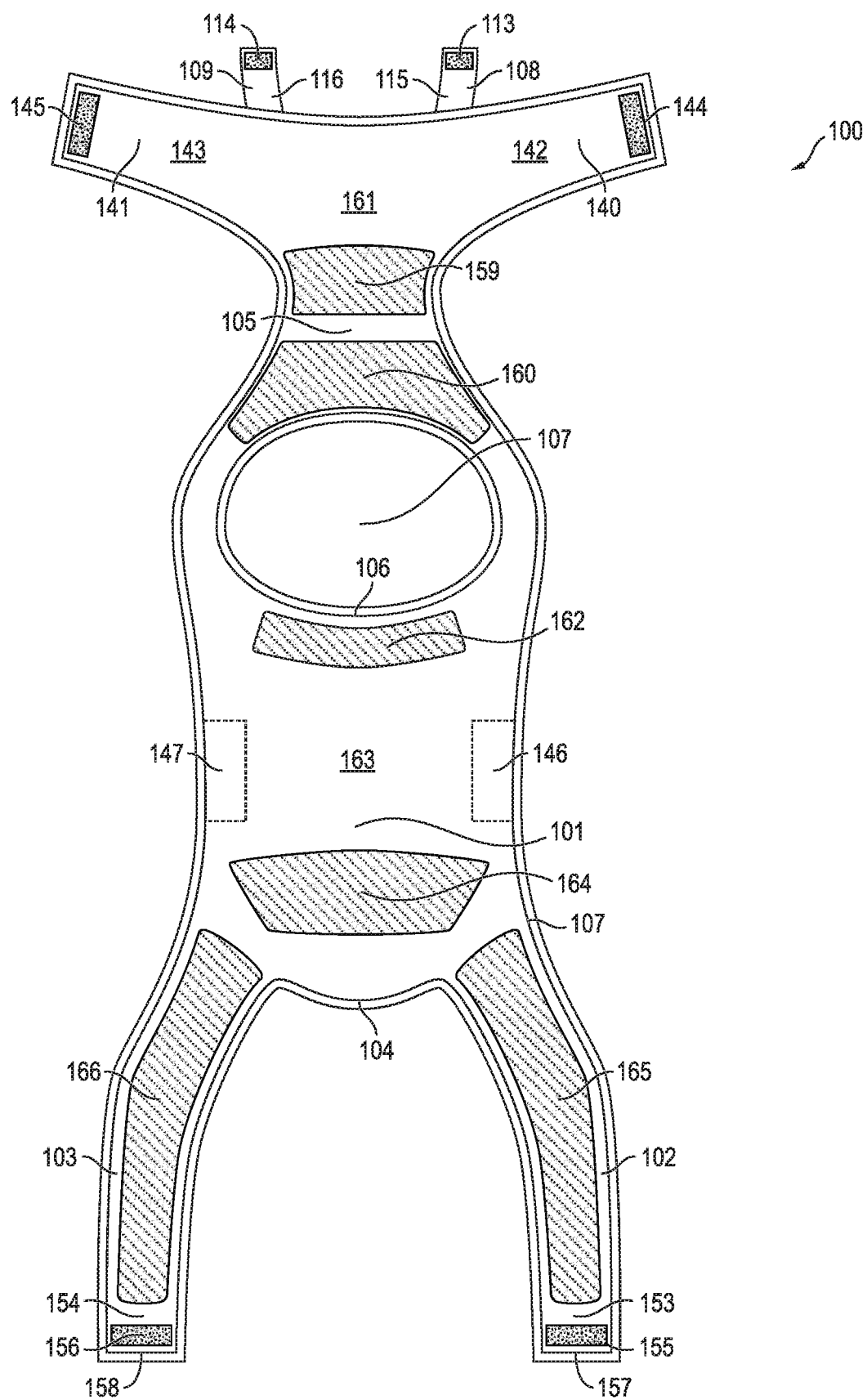
Figure 2A:
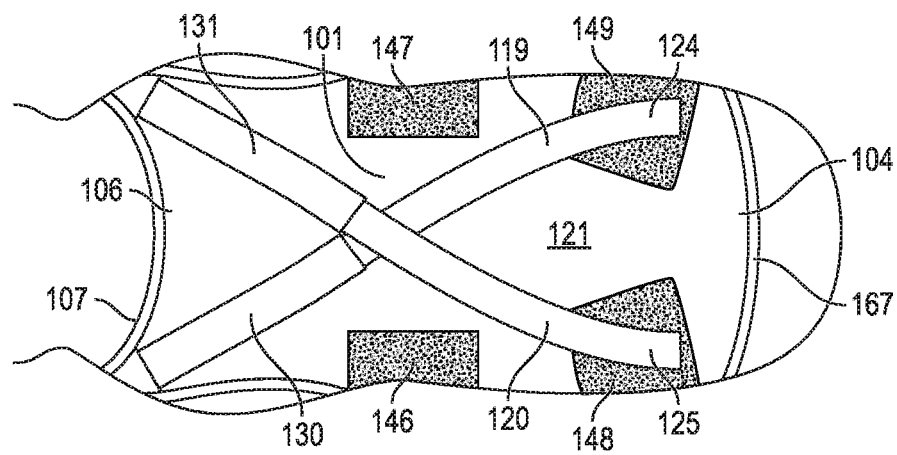
FIGS. 2A-2D are a top view, a side view, a rear view, and a front view, respectively, of the embodiment of the therapeutic garment illustrated in FIGS. 1A-1B secured to a canine.
Figure 2B:
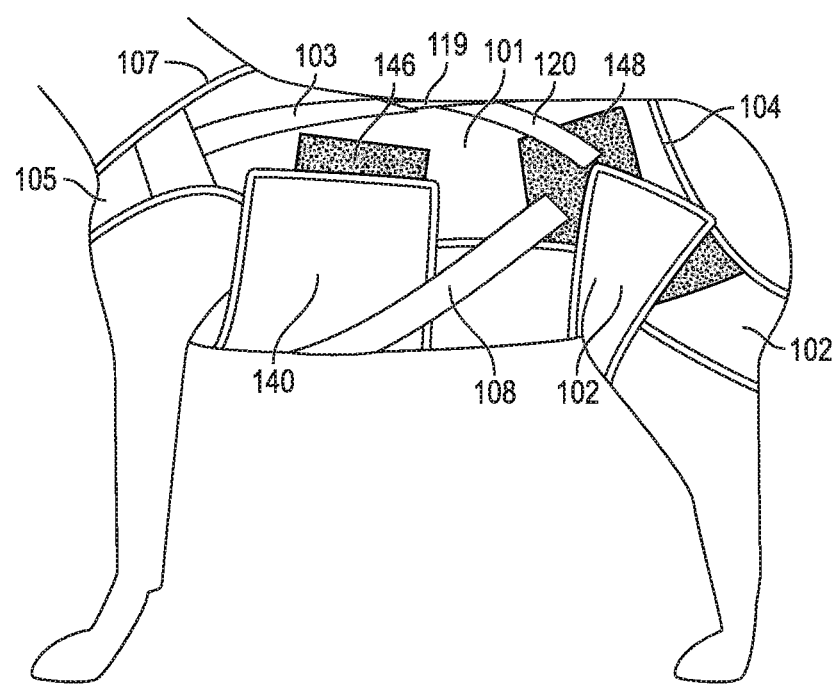
Figure 2C:
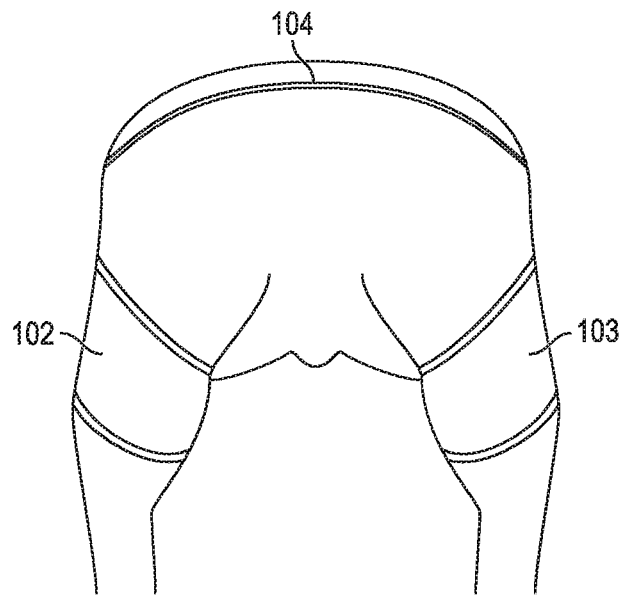
Figure 2D:
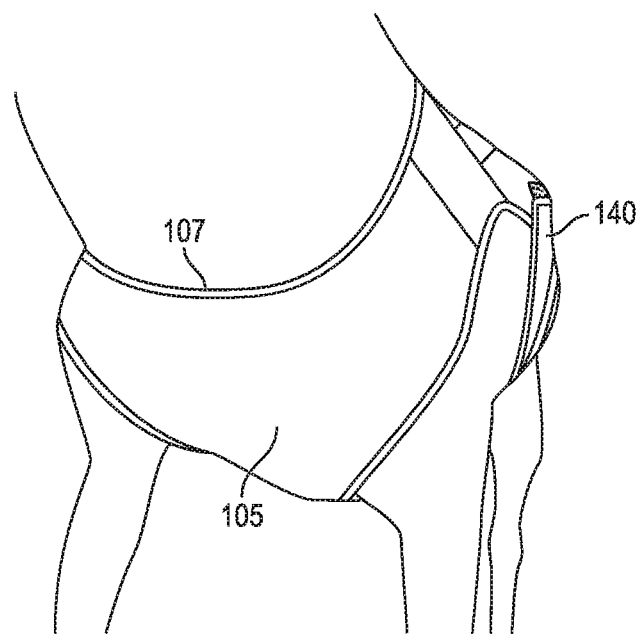

With reference now to FIGS. 1A-1B, a therapeutic garment 100 according to one embodiment of the present disclosure includes a body portion 101, a pair of leg straps 102, 103 extending caudally from a caudal end 104 (i.e., a rear end) of the body portion 101, and a chest plate portion 105 extending cranially from a cranial end 106 (i.e., a front end) of the body portion 101. Additionally, in the illustrated embodiment, an opening 107 is defined in the body portion 101 proximate the cranial end 104 of the body portion 101. The opening 107 is configured to accommodate an animal's head such that the therapeutic garment 100 may be slipped on the animal's head. The opening 107 may have any size and shape suitable for the size and breed of the animal with which the therapeutic garment 100 is intended to be used.

In one or more embodiments, the body portion 101, the chest plate portion 105, and the pair of legs straps 102, 103 may each include a resilient and elastic fabric, such as a blend of nylon and spandex (e.g., a fabric including a blend of approximately 66% nylon and approximately 34% spandex, such as Tweave Durastretch™ 544P fabric). In one or more embodiments, the body portion 101, the chest plate portion 105, and the pair of legs straps 102, 103 may each include any other resilient, elastic fabric. In one or more embodiments, the body portion 101, the chest plate portion 105, and the pair of legs straps 102, 103 each include a breathable (e.g., porous) and washable woven, omni-directional elastic material. The resilient and elastic material of the body portion 101, the chest plate portion 105, and the pair of leg straps 102, 103 is configured to conform to the animal's body and provide symmetric and uniform pressure and sensory stimulation to the animal's spine, chest, and hips. As described in more detail below, the resilient and elastic material of the body portion 101, the chest plate portion 105, and the pair of legs straps 102, 103 is also configured to provide proprioceptive input to the animal.

With continued reference to the embodiment illustrated in FIG. 1A, the therapeutic garment 100 includes a pair of ventral elastic straps 108, 109 coupled to an exterior surface 110 of the chest plate portion 105. In the illustrated embodiment, the ventral elastic straps 108, 109 are sewn to the exterior surface 110 of the chest plate portion 105. In one or more embodiments, the ventral elastic straps 108, 109 may be coupled to the exterior surface 110 of the chest plate portion 105 in any other suitable manner, such as with fasteners (e.g., rivets). In one or more embodiments, the ventral elastic straps 108, 109 may be integral with the chest plate portion 105 of the therapeutic garment 100. Additionally, in the illustrated embodiment, each of the ventral elastic straps 108, 109 includes a cranial end 111, 112, respectively, and a caudal end 113, 114, respectively, opposite the respective cranial end 111, 112. In the illustrated embodiment, the cranial ends 111, 112 of the ventral elastic straps 108, 109 are coupled to the exterior surface 110 of the chest plate portion 105 and the caudal ends 113, 114 of the ventral elastic straps 108, 109 hang freely (e.g., are unsecured) when the therapeutic garment 100 is not secured to an animal (e.g., the caudal ends 113, 114 of the ventral elastic straps 108, 109 hang freely before the therapeutic garment 100 is secured to an animal). Furthermore, in the illustrated embodiment, the ventral elastic straps 108, 109 diverge from each other in a direction from the cranial ends 111, 112 to the caudal ends 113, 114 of the ventral elastic straps 108, 109. Accordingly, in the illustrated embodiment, the cranial ends 111, 112 of the ventral elastic straps 108, 109 are spaced apart from each other by a first distance $d_1$ and the caudal ends 113, 114 of the ventral elastic straps 108, 109 are spaced apart from each other by a second distance $d_2$ greater than the first distance $d_1$. In one or more embodiments, the cranial ends 111, 112 of the ventral elastic straps 108, 109 may be coupled together such that the first distance $d_1$ is zero or substantially zero.

In the embodiment illustrated in FIG. 1B, interior surfaces 115, 116 of the ventral elastic straps 108, 109, respectively, include one or more fasteners 117, 118, respectively, (e.g., hook or loop type fasteners) for securing the ventral elastic straps 108, 109 to the caudal end 104 of the body portion 101, as described in more detail below. In the illustrated embodiment, the one or more fasteners 117, 118 are located proximate to the caudal ends 113, 114, respectively, of the ventral elastic straps 108, 109. In one or more embodiments, the one or more fasteners 117, 118 may be located along the entire length or along substantially the entire length of the ventral elastic straps 108, 109.

The ventral elastic straps 108, 109 may be made out of any suitably elastic material depending, for instance, on the amount of tension the ventral elastic straps 108, 109 are configured to supply to the animal, the size and breed of the animal, and/or the severity of the medical condition afflicting the animal. In one or more embodiments, the ventral elastic straps 108, 109 may each have a width $w_1$ from approximately 0.5 inch to approximately 3 inches. In one or more embodiments, the ventral elastic straps 108, 109 may have any suitable width $w_1$ depending, for instance, on the size and breed of the animal. For instance, in one embodiment in which therapeutic garment 100 is designed for use with a canine weighing in a range from approximately 60 pounds to approximately 95 pounds, the ventral elastic straps 108, 109 may each have a width $w_1$ of approximately 1.5 inches. Additionally, in one or more embodiments, the ventral elastic straps 108, 109 may have a resiliency that is greater than the resiliency of the body portion 101, the chest plate portion 105, and the pair of legs straps 102, 103 (e.g., the ventral elastic straps 108, 109 are configured to supply greater tension on the animal than the body portion 101, the chest plate portion 105, and the pair of legs straps 102, 103). In one or more embodiments, the ventral elastic straps 108, 109 are each configured to supply a tensile force of at least 1 Newton (N). In one or more embodiments, the ventral elastic straps 108, 109 are each configured to supply a tensile force in a range from approximately 1 Newton (N) to approximately 30 N (e.g., a range from approximately 1 N to approximately 18 N) depending, for instance, on the size and breed of the animal and/or the severity of the medical condition afflicting the animal.

With reference again now to the embodiment illustrated in FIG. 1A, the therapeutic garment 100 also includes a pair of dorsal elastic straps 119, 120 (e.g., a first dorsal elastic strap 119 and a second dorsal elastic strap 120) coupled to an exterior surface 121 of the body portion 101 (e.g., the therapeutic garment 100 includes two over-the-back elastic straps 119, 120). In the illustrated embodiment, the dorsal elastic straps 119, 120 are sewn to body portion 101. In one or more embodiments, the dorsal elastic straps 119, 120 may be coupled to the body portion 101 in any other suitable manner, such as with fasteners (e.g., rivets). In one or more embodiments, the dorsal elastic straps 119, 120 may be integral with the body portion 101 of the therapeutic garment 100. Additionally, in the illustrated embodiment, each of the dorsal elastic straps 119, 120 includes a cranial end 122, 123, respectively, and a caudal end 124, 125, respectively, opposite the respective cranial end 122, 123. In the illustrated embodiment, the cranial ends 122, 123 of the dorsal elastic straps 119, 120 are coupled to the body portion 101 and the caudal ends 124, 125 of the dorsal elastic straps 119, 120 hang freely (e.g., are unsecured) when the therapeutic garment 100 is not secured to an animal (e.g., the caudal ends 124, 125 of the dorsal elastic straps 119, 120 hang freely before the therapeutic garment 100 is secured to an animal).

In the illustrated embodiment, the cranial end 122 of the first dorsal elastic strap 119 is coupled to the body portion 101 proximate to a first lateral side 126 of the body portion 101, and the cranial end 123 of the second dorsal elastic strap 120 is coupled to the body portion 101 proximate to the a second lateral side 127 of the body portion 101 opposite to the first lateral side 126. Furthermore, in the illustrated embodiment, the dorsal elastic straps 119, 120 cross each other (e.g., intermediate portions of the dorsal elastic straps 119, 120 between the cranial ends 122, 123 and the caudal ends 124, 125 cross each other). In the illustrated embodiment, the first dorsal elastic strap 119 extends, in a direction from the cranial end 122 to the caudal end 124, toward the second lateral side 127 and the caudal end 104 of the body portion 101. The second dorsal elastic strap 120 extends, in a direction from the cranial end 123 to the caudal end 125, toward the first lateral side 126 and the caudal end 104 of the body portion 101. Accordingly, in the illustrated embodiment, the dorsal elastic straps 119, 120 extend caudally toward contralateral sides 127, 126 of the body portion 101.

Additionally, in the embodiment illustrated in FIG. 1A, inner surfaces of the dorsal elastic straps 119, 120, respectively, include one or more fasteners 128, 129, respectively, (e.g., hook or loop type fasteners) for securing the dorsal elastic straps 119, 120 to the caudal end 104 of the body portion 101, as described in more detail below. In the illustrated embodiment, the one or more fasteners 128, 129 are located proximate to the caudal ends 124, 125, respectively, of the dorsal elastic straps 119, 120. In one or more embodiments, the one or more fasteners 128, 129 may be located along the entire length or along substantially the entire length of the dorsal elastic straps 119, 120.

The dorsal elastic straps 119, 120 may be made out of any suitably elastic material depending, for instance, on the amount of tension the dorsal elastic straps 119, 120 are configured to supply to the animal, the size and breed of the animal, and/or the severity of the medical condition afflicting the animal. In one or more embodiments, the dorsal elastic straps 119, 120 may each have a width $w_2$ from approximately 0.5 inch to approximately 3 inches. In one or more embodiments, the dorsal elastic straps 119, 120 may have any suitable width $w_2$ depending, for instance, on the size and breed of the animal. For instance, in one embodiment in which therapeutic garment 100 is designed for use with a canine weighing in a range from approximately 60 pounds to approximately 95 pounds, the dorsal elastic straps 119, 120 may each have a width $w_2$ of approximately 1.5 inches. Additionally, in one or more embodiments, the dorsal elastic straps 119, 120 may have a resiliency that is greater than the resiliency of the body portion 101, the chest plate portion 105, and the pair of legs straps 102, 103 (e.g., the dorsal elastic straps 119, 120 are configured to supply greater tension on the animal than the body portion 101, the chest plate portion 105, and the pair of legs straps 102, 103). In one or more embodiments, the resiliency of the dorsal elastic straps 119, 120 may be the same or substantially the same as the resiliency of the ventral elastic straps 108, 109, although in one or more embodiments, the resiliency of the dorsal elastic straps 119, 120 may be different than the resiliency of the ventral elastic straps 108, 109 (e.g., the resiliency of the dorsal elastic straps 119, 120 may be greater than or less than the resiliency of the ventral elastic straps 108, 109). In one or more embodiments, the dorsal elastic straps 119, 120 are each configured to supply a tensile force of at least 1 N. In one or more embodiments, the dorsal elastic straps 119, 120 are each configured to supply a tensile force in a range from approximately 1 N to approximately 30 N (e.g., a range from approximately 1 N to approximately 18 N) depending, for instance, on the size and breed of the animal and/or the severity of the medical condition afflicting the animal.

In the illustrated embodiment, the therapeutic garment 100 includes a pair of tunnels 130, 131 (e.g., a first tunnel 130 and a second tunnel 131) coupled to the exterior surface of the 121 of the body portion 101. In one or more embodiments, the tunnels 130, 131 may be fabric. In one or more embodiments, the tunnels 130, 131 may include the same material as the body portion 101, although in one or more embodiments the material of the tunnels 130, 131 may be different than the material of the body portion 101. For instance, in one or more embodiments, the tunnels 130, 131 may include an inelastic or substantially inelastic material. In one or more embodiments, the tunnels 130, 131 may include a material with less elasticity than the material of the body portion 101. In the illustrated embodiment, the tunnels 130, 131 are sewn to the body portion 101. In one or more embodiments, the tunnels 130, 131 may be coupled to the body portion 101 in any other suitable manner, such as with fasteners (e.g., rivets).

In the illustrated embodiment, each of the tunnels 130, 131 includes a cranial end 132, 133 and a caudal end 134, 135 opposite the cranial end 132, 133, respectively. In the illustrated embodiment, the cranial end 132 of the first tunnel 130 is coupled to the body portion 101 proximate to the first lateral side 126 of the body portion 101, and the cranial end 133 of the second tunnel 131 is coupled to the body portion 101 proximate to the second lateral side 127 of the body portion 101 opposite to the first lateral side 126. Additionally, in the illustrated embodiment, the caudal end 134 of the first tunnel 130 is spaced medially from the first lateral side 126 of the body portion 101 such that the first tunnel 130 extends, in a direction from the cranial end 132 to the caudal end 134, toward the second lateral side 127 and the caudal end 104 of the body portion 101. Furthermore, in the illustrated embodiment, the caudal end 135 of the second tunnel 131 is spaced medially from the second lateral side 127 of the body portion 101 such that the second tunnel 131 extends, in a direction from the cranial end 133 to the caudal end 135, toward the first lateral side 126 and the caudal end 104 of the body portion 101. Accordingly, in the illustrated embodiment, the tunnels 130, 131 extend caudally toward contralateral sides 127, 126 of the body portion 101.

With continued reference to the embodiment illustrated in FIG. 1B, each of the tunnels 130, 131 defines a pocket or cavity 136, 137, respectively. In the illustrated embodiment, the tunnels 130, 131 each also define an opening 138, 139, respectively. The openings 138, 139 are in communication with the pockets 136, 137, respectively, defined in the tunnels 130, 131 (e.g., the openings 138, 139 open up to the pockets 136, 137, respectively). In the illustrated embodiment, the openings 138, 139 are defined in caudal ends 134, 135, respectively, of the tunnels 130, 131.

The cranial ends 122, 123 of the dorsal elastic straps 119, 120 are housed in the pockets 136, 137, respectively, of the tunnels 130, 131. Intermediate portions of the dorsal elastic straps 119, 120 extend out through the openings 138, 139, respectively, in the caudal ends 134, 135 of the tunnels 130, 131. Accordingly, in the illustrated embodiment, the tunnels 130, 131 cover the cranial ends 122, 123 of the dorsal elastic straps 119, 120 and portions of the dorsal elastic straps 119, 120 proximate to the cranial ends 122, 123 of the dorsal elastic straps 119, 120. The tunnels 130, 131 are configured to orient the dorsal elastic straps 119, 120 such that the first dorsal elastic strap 119 extends, in a direction from the cranial end 122 to the caudal end 124, toward the second lateral side 127 and the caudal end 104 of the body portion 101, and the second dorsal elastic strap 120 extends, in a direction from the cranial end 123 to the caudal end 125, toward the first lateral side 126 and the caudal end 104 of the body portion 101 (e.g., the tunnels 130, 131 are configured to orient the dorsal elastic straps 119, 120 such that the dorsal elastic straps 119, 120 extend caudally toward contralateral sides 127, 126 of the body portion 101). In one or more embodiments, the therapeutic garment 100 may be provided without the tunnels 130, 131. In one or more embodiments in which the therapeutic garment 100 is provided without the tunnels 130, 131, portions of the dorsal elastic straps 119, 120 proximate to the cranial ends 122, 123 may be attached (e.g., by stitching or rivets) to the body portion 101 of the therapeutic garment 100 to orient the dorsal elastic straps 119, 120 such that the dorsal elastic straps 119, 120 extend caudally toward contralateral sides 127, 126 of the body portion 101.

With continued reference to the embodiment illustrated in FIGS. 1A-1B, the chest plate portion 105 of the therapeutic garment 100 includes a pair of opposing flaps 140, 141 (e.g., a first flap 140 extending laterally in a first direction and a second flap 141 extending laterally in a second direction opposite the first direction). Additionally, in the illustrated embodiment, inner surfaces 142, 143 of the flaps 140, 141 include fasteners 144, 145, respectively, configured to detachably secure the chest plate portion 105 to the body portion 101 when the therapeutic garment 100 is worn by an animal. In the illustrated embodiment, the fasteners 144, 145 are located at ends of the flaps 140, 141. The fasteners 144, 145 may be any suitable type or kind of fastener, such as, for instance, a pad of hook type fasteners or a pad of loop type fasteners. In one or more embodiments, the fasteners 144, 145 may include button-type snaps.

With continued reference to the embodiment illustrated in FIG. 1A, the therapeutic garment 100 also includes a pair of fasteners 146, 147 coupled to the exterior surface 121 of the body portion 101. In the illustrated embodiment, the fasteners 146, 147 are located along the lateral sides 126, 127, respectively, of the body portion 101 (e.g., the therapeutic garment 100 includes a pair of opposing fasteners 146, 147). In the illustrated embodiment, the fasteners 146, 147 are located at an intermediate portion (e.g., the middle) between the cranial end 106 and the caudal end 104 of the body portion 101. As described in more detail below, the fasteners 146, 147 are configured to detachably secure the chest plate portion 105 to the body portion 101 when the therapeutic garment 101 is worn by an animal. In one or more embodiments, the fasteners 146, 147 along the lateral sides 126, 127 of the body portion 101 may be a pad of hook type fasteners and the fasteners 144, 145 on the flaps 140, 141 of the chest plate portion 105 may be a corresponding pad of loop type fasteners. In one or more embodiments, the fasteners 146, 147 along the lateral sides 126, 127 of the body portion 101 may be a pad of loop type fasteners and the fasteners 144, 145 on the flaps 140, 141 of the chest plate portion 105 may be a corresponding pad of hook type fasteners. That is, in one or more embodiments, the therapeutic garment 100 includes include hook-and-loop type fasteners to detachably secure the chest plate portion 105 to the body portion 101 when the therapeutic garment 101 is worn by an animal. In one or more embodiments, the fasteners 146, 147 may be any other suitable type or kind of fasteners configured to detachably secure the chest plate portion 105 to the body portion 101, such as, for example, button-type snaps.

In the illustrated embodiment, the therapeutic garment 100 also includes a pair of rear fasteners 148, 149 coupled to the exterior surface 121 of the body portion 101 and/or exterior surfaces 150, 151 of the leg straps 102, 103, respectively. In the illustrated embodiment, the rear fasteners 148, 149 are located proximate to the lateral sides 126, 127, respectively, of the body portion 101 and proximate to the caudal end 104 of the body portion 101 (e.g., the rear fasteners 148, 149 are provided proximate to caudal corners of the therapeutic garment 100). In in the illustrated embodiment, the rear fasteners 148, 149 extend from the caudal end 104 of the body portion 101 to cranial ends 151, 152, respectively, of the leg straps 102, 103 (e.g., the rear fasteners 148, 149 are coupled to exterior surface 121 of the body portion 101 and the exterior surfaces 150, 151, respectively, of the leg straps 102, 103). In one or more embodiments, the rear fasteners 148, 149 may be provided only on the exterior surfaces 150, 151, respectively, of the leg straps 102, 103. In one or more embodiments, the rear fasteners 148, 149 are positioned on the therapeutic garment 100 such that the rear fasteners 148, 149 are aligned or substantially aligned with the coxofemoral joints (i.e., the hips) of the animal when the therapeutic garment 100 is secured to the animal.

As described in more detail below, the caudal ends 124, 125 of the dorsal elastic straps 119, 120 and the caudal ends 113, 114 of the ventral elastic straps 108, 108 are configured to be detachably secured to the rear fasteners 148, 149, respectively, when the therapeutic garment 100 is worn by an animal. In one or more embodiments, the rear fasteners 148, 149 may each be a pad of loop type fasteners and the fasteners 128, 129 on the dorsal elastic straps 119, 120 and the fasteners 144, 145 on the ventral elastic straps 140, 141 may be corresponding hook type fasteners. In one or more embodiments, the rear fasteners 148, 149 may each be a pad of hook type fasteners and the fasteners 128, 129 on the dorsal elastic straps 119, 120 and the fasteners 144, 145 on the ventral elastic straps 140, 141 may be a corresponding pad of loop type fasteners. That is, in one or more embodiments, the therapeutic garment 100 includes include hook-and-loop type fasteners to detachably secure the ventral elastic straps 108, 109, the dorsal elastic straps 119, 120, and the leg straps 102, 103 proximate to the caudal end 104 of the body portion 101 and proximate to the lateral sides 126, 127 of the body portion 101 when the therapeutic garment 101 is worn by an animal. Hook and loop type fasteners are configured to provide adjustability to both the amount of tension supplied by the dorsal and ventral elastic straps 119, 120, 108, 109 and the angle (e.g., force vector) at which the tension is supplied by the dorsal and ventral elastic straps 119, 120, 108, 109 to the animal. In one or more embodiments, the rear fasteners 148, 149 and the fasteners 128, 129, 144, 145 on the dorsal and ventral elastic straps 119, 120, 108, 109 may be any other suitable type or kind of fasteners configured to detachably secure the caudal ends 124, 125, 113, 114 of the dorsal and ventral elastic straps 119, 120, 108, 109 proximate to the caudal end 104 of the body portion 101 and proximate to the lateral sides 126, 127 of the body portion 101, such as, for instance, button-type snaps. Although in the illustrated embodiment the therapeutic garment 100 includes two rear fasteners 148, 149, in one or more embodiments, the therapeutic garment 100 may include any other suitable number of rear fasteners, such as, for instance, a single rear fastener or more than two rear fasteners. In general, increasing the number of locations of the rear fasteners and/or increasing the size of the rear fasteners is configured to increase the number of angles at which the dorsal and ventral straps 119, 120, 108, 109 may be secured to the body portion 101, which enables a veterinarian or animal rehabilitation practitioner to make more customized adjustments to the dorsal and ventral elastic straps 119, 120, 108, 109 to enhance the therapeutic effect of the therapeutic garment 100 and/or inhibit maladaptive movement patterns developed by the animal. Additionally, in one or more embodiments, additional fasteners may be provided at any other suitable locations on the therapeutic garment 100, such as on the chest plate portion 105 of the therapeutic garment 100 and/or on other portions of the body portion 101 of the therapeutic garment 100. Moreover, in one or more embodiments, the therapeutic garment 100 may include a series of ventral elastic straps 108, 109 with different elasticities and/or a series of dorsal elastic straps 119, 120 with different elasticities, which enables a veterinarian or animal rehabilitation practitioner to select the elastic straps 108, 109, 119, 120 having the desired elasticity that is configured to provide the desired tension on the animal's trunk and/or hips. Providing elastic straps 108, 109, 119, 120 with different degrees of elasticity may be useful for animals with more pronounced disabilities or other comorbidities affecting their function.

With reference now to the embodiment illustrated in FIG. 1B, inner surfaces 153, 154 of the leg straps 102, 103, respectively, include one or more fasteners 155, 156, respectively, (e.g., hook or loop type fasteners) for securing the leg straps 102, 103 to rear fasteners 148, 149 at the caudal end 104 of the body portion 101 and/or the cranial ends 151, 152 of the leg straps 102, 103, as described in more detail below. In the illustrated embodiment, the one or more fasteners 155, 156 are located proximate to caudal ends 157, 158, respectively, of the leg straps 102, 103. In one or more embodiments, the one or more fasteners 155, 156 may be located along the entire length or along substantially the entire length of the leg straps 102, 103.

With continued reference to the embodiment illustrated in FIG. 1B, inner surfaces of the therapeutic garment 100 also include a series of nonslip pads (e.g. nonskid pads or stabilizing pads). The nonslip pads are configured to aid in holding the therapeutic garment 100 in the proper anatomical position on the animal after the therapeutic garment 100 has been secured to the animal (e.g., the nonslip pads are configured to mitigate against the therapeutic garment 100 slipping out of the proper anatomical position on the animal). In the illustrated embodiment, the therapeutic garment 100 includes a series of discrete nonslip pads (e.g., the nonslip pads are not provided continuously over the inner surfaces of the therapeutic garment 100). Providing the nonslip pads in discrete areas, rather than continuously on an interior of the therapeutic garment 100, is configured not to impede the animal's natural movement and is configured to allow the therapeutic garment 100 to stretch and thereby conform to fit a range of differently sized and shaped animals.

In the illustrated embodiment, the therapeutic garment 100 includes two nonslip pads 159, 160 (e.g., two non-slip pads) on an inner surface 161 of the chest plate portion 105 (e.g., the therapeutic garment 100 may include a caudal nonslip pad 159 and a cranial nonslip pad 160 on the inner surface 161 of the chest plate portion 105). The nonslip pads 159, 160 on the chest plate portion 105 are configured to aid in maintaining the therapeutic garment 100 centered over the animal's neck and chest and are configured to prevent or mitigate against the therapeutic garment 100 rotating around the animal's neck and chest. The two nonslip pads 159, 160 on the inner surface 161 of the chest plate portion 105 are also configured to maintain the cranial ends 111, 112 of the ventral elastic straps 108, 109 on the proper anatomical area of the animal to transmit the desired tensile forces to the animal's hips, as described in more detail below. The two nonslip pads 159, 160 on the inner surface 161 of the chest plate portion 105 are also configured to mitigate against the therapeutic garment 100 sliding cranially and dorsally, which could otherwise cause a remainder of the therapeutic garment 100 to slide caudally (e.g., slide backward over the withers (i.e., the shoulder blades) of the animal).

In the illustrated embodiment, the therapeutic garment 100 also includes a nonslip pad 162 (e.g., a non-slip pad) on an inner surface 163 of the body portion 101. In the illustrated embodiment, the nonslip pad 162 is proximate to the cranial end 106 of the body portion 101. The nonslip pad 162, in conjunction with the two nonslip pads 159, 160 on the inner surface 161 of the chest plate portion 105, is configured to aid in maintaining the therapeutic garment 100 centered over the animal's neck and chest and is configured to prevent the therapeutic garment 100 from rotating around the animal's neck and chest. The nonslip pad 162 on the inner surface 163 of the body portion 101 is also configured to maintain the cranial ends 122, 123 of the dorsal elastic straps 119, 120 on the proper anatomical area of the animal to transmit the desired tensile forces to the animal's hips, as described in more detail below.

With continued reference to the embodiment illustrated in FIG. 1B, the therapeutic garment 100 also includes a nonslip pad 164 (e.g., a non-slip pad) on the inner surface 163 of the body portion 101 proximate to the caudal end 104 of the body portion 101. The nonslip pad 164 is configured to aid in maintaining the therapeutic garment 100 centered over the base of the animal's sacrum and is configured to mitigate against the therapeutic garment 100 displacing cranially when tension is applied to the animal from the dorsal and ventral elastic straps 119, 120, 108, 109.

In the illustrated embodiment, the therapeutic garment 100 also includes a pair of nonslip pads 165, 166 on the inner surfaces 153, 154 of the leg straps 102, 103, respectively. The nonslip pads 165, 166 on the leg straps 102, 103 are configured to maintain the therapeutic garment 100 secured to the animal's hind limbs. The nonslip pads 165, 166 on the leg straps 102, 103 are also configured to mitigate against the therapeutic garment 100 sliding dorsally and, in conjunction with the nonslip pad 164 proximate to the caudal end 104 of the body portion 101, are configured to mitigate against the therapeutic garment 100 sliding cranially.

The nonslip pads 159, 160, 162, 164, 165, 166 may be attached to the body portion 101, the chest plate portion 105, and the leg straps 102, 103 in any suitable manner, such as by stitching. In one or more embodiments, the nonslip pads 159, 160, 162, 164, 165, 166 may be latex-free or substantially latex-free and neoprene-free or substantially neoprene-free to mitigate against the nonslip pads 159, 160, 162, 164, 165, 166 irritating the skin of the animal and/or causing an allergic reaction by the animal. Additionally, in one or more embodiments, the nonslip pads 159, 160, 162, 164, 165, 166 may be made out of a washable, breathable, moisture wicking fabric. In one or more embodiments, each of the nonslip pads 159, 160, 162, 164, 165, 166 may be a composite of an open-celled, elastomeric foam and a fabric (e.g., Fabrifoam™). In one or more embodiments, the nonslip pads 159, 160, 162, 164, 165, 166 are configured to create a greater amount of friction against the animal (e.g., against the skin and/or the fur of the animal) than the body portion 101, the chest plate portion 105, and/or the leg straps 102, 103 (e.g., the body portion 101, the chest plate portion 105, and/or the leg straps 102, 103 each have a first coefficient of friction, and at least one of the nonslip pads 159, 160, 162, 164, 165, 166 has a second coefficient of friction greater than the first coefficient of friction). That is, in one or more embodiments, the body portion 101, the chest plate portion 105, and/or the leg straps 102, 103 are configured to create a first amount of friction against the animal, and the nonslip pads 159, 160, 162, 164, 165, 166 are configured to create a second amount of friction against the animal greater than the first amount of friction. Accordingly, the nonslip pads 159, 160, 162, 164, 165, 166 are less likely to move (e.g., slide) along the skin and/or fur of the animal than portions of the body portion 101, the chest plate portion 105, and/or the leg straps 102, 103.

In the illustrated embodiment, the therapeutic garment 100 also includes a binding 167 extending around a combined periphery of the body portion 101, the chest plate portion 105, and the leg straps 102, 103. In one or more embodiments, the binding 167 is a resilient and elastic material, such as an elastic polyurethane fabric (e.g., Lycra™). In one or more embodiments, the binding 167 may have a stretch characteristic that is the same or substantially the same as body portion 101, the chest plate portion 105, and the leg straps 102, 103. The binding 167 is configured to conform to animals having different shapes. The binding 167 is also configured to mitigate against the formation of pressure points along the periphery of the therapeutic garment 100, which could otherwise lead to discomfort and/or skin breakdown on the animal.

FIGS. 2A-2D depict the therapeutic garment 100 according to one embodiment of the present disclosure secured to a canine. In one or more embodiments, the therapeutic garment 100 may be configured for use with any other animal, such as a horse. To secure the therapeutic garment 100 to the animal, the therapeutic garment 100 may be first slid onto the animal's body such that the animal's head extends through the opening 107 in the body portion 101. The therapeutic garment 100 may then be oriented such that the body portion 101 of the therapeutic garment 101 extends along the dorsal side of the animal. In one or more embodiments, the chest plate portion 105 may then be positioned along the ventral side of the animal (e.g., along the thorax of the animal) and then the fasteners 144, 145 on the flaps 140, 141 of the chest plate portion 105 may be secured to the fasteners 146, 147 along the lateral sides 126, 127 of the body portion 101. When the chest plate portion 105 is secured to the fasteners 146, 147 on the body portion 101, the chest plate portion 105 covers at least a portion of the thorax of the animal.

The leg straps 102, 103 may then be secured to the hind legs of the animals. One of the legs straps 103 may be secured to a right rear leg of the animal by wrapping the leg strap 103 from the lateral side to the medial side of the right rear leg and then detachably connecting the fastener 156 on the leg strap 103 to the rear fastener 149 at the caudal end 104 of the body portion 101 and/or the cranial end 152 of the leg strap 103. The other leg strap 102 may be secured to the left rear leg of the animal by wrapping the leg strap 102 from the lateral side to the medial side of the left rear leg and then detachably connecting the fastener 155 on the leg strap 102 to the rear fastener 148 at the caudal end 104 of the body portion 101 and/or the cranial end 151 of the leg strap 102.

The fasteners 128, 129 at the caudal ends 124, 125 of the dorsal elastic straps 119, 120 may then be detachably connected to the rear fasteners 149, 148, respectively. In the illustrated embodiment, the left dorsal elastic strap 119 is extended caudally along the dorsal side of the animal and then attached to the right rear fastener 149 proximate to the caudal end 104 and the lateral side 127 of the body portion 101, and the right dorsal elastic strap 120 is extended caudally along the dorsal side of the animal and then attached to the left rear fastener 148 proximate to the caudal end 104 and the lateral side 126 of the body portion 101 (e.g., the dorsal elastic straps 119, 120 are connected proximate to contralateral sides 127, 126 of the caudal end 104 of the body portion 101). In the illustrated embodiment, the dorsal elastic straps 119, 120 cross each other once the dorsal elastic straps 119, 120 are connected to the rear fasteners 149, 148, respectively. When the dorsal elastic straps 119, 120 are connected to the rear fasteners 149, 148, the dorsal elastic straps 119, 120 provide a dorsally- and medially-directed force on the animal as the animal moves at least one of its front legs forward (e.g., as the animal walks). In one or more embodiments, the dorsally- and medially-directed forces supplied on the animal by the dorsal elastic straps 108, 109 are greater than the force supplied on the animal by the resilient and elastic material of the body portion 101, the chest plate portion 105, and the leg straps 102, 103.

The ventral elastic straps 108, 109 may then be secured to the rear fasteners 148, 149, respectively, proximate to the caudal end 104 and the lateral sides 126, 127 of the body portion 101. In the illustrated embodiment, the right ventral elastic strap 109 is extended caudally along the ventral side of the animal and then extended dorsally at the caudal end of the animal and attached to the right rear fastener 149 (e.g., the right pad of hook or loop type fasteners). In the illustrated embodiment, the left ventral elastic strap 108 is extended caudally along the ventral side of the animal and then extended dorsally at the caudal end of the animal and attached to the left rear fastener 148 (e.g., the left pad of hook or loop type fasteners). When the ventral elastic straps 108, 109 are connected to the rear fasteners 148, 149, the ventral elastic straps 108, 109 provide a ventrally- and medially-directed force on the animal as the animal moves at least one of its front legs forward (e.g., as the animal walks). In one or more embodiments, the ventrally- and medially-directed forces supplied on the animal by the ventral elastic straps 108, 109 are greater than the force supplied on the animal by the resilient and elastic material of the body portion 101, the chest plate portion 105, and the leg straps 102, 103.

Additionally, in the illustrated embodiment, the ventrally-directed force supplied by the ventral elastic straps 108, 109 is balanced or substantially balanced (e.g., offset or substantially offset) by the dorsally-directed force supplied by the dorsal elastic straps 119, 120 such that the net force acting on the animal from the dorsal and ventral elastic straps 119, 120, 108, 109 is a medially-directed force. This net medially-directed force supplied by the dorsal and ventral elastic straps 119, 120, 108, 109 is configured to assist in more deeply seating the femoral heads into the acetabulums of the animal's coxofemoral joints.

In one or more embodiments, the tasks of securing the therapeutic garment 100 to the animal may be performed in any other suitable order. For instance, in one or more embodiments, ventral elastic straps 108, 109 may be attached to the rear fasteners 148, 149 before the dorsal elastic straps 119, 120 are attached to the rear fasteners 148, 149. Additionally, in one or more embodiments, the ventral elastic straps 108, 109 and/or the dorsal elastic straps 119, 120 may be attached to the rear fasteners 148, 149 before the leg straps 102, 103 are attached to the rear fasteners 148, 149.

In the illustrated embodiment, the therapeutic garment 100 is configured to supply a substantially symmetric and substantially uniform pressure and sensory stimulation over the animal's spine, chest, and hips. In one or more embodiments, the body portion 101 and the chest plate portion 105 of the therapeutic garment 100 are configured to supply a force on the animal in a range from approximately 1 N to approximately 22 N. The substantially symmetric and uniform pressure supplied by the therapeutic garment 100 increases the animal's awareness of its body. Accordingly, even when the animal is at rest, the therapeutic garment 100 is configured to provide a continuous stimulus through the animal's neuromuscular system via the proprioceptors and cutaneous nerve fibers to assist in maintaining the animal's neutrally balanced posture, which is the optimal positioning of the joints and muscles. Animals that maintain a neutrally balanced posture, including during movement, will have less damage on their joints and will have a decreased risk for injuries. For this reason, the therapeutic garment 100 may be utilized in very early cases of hip dysplasia to help train the animal's neuromuscular system to function close to normal, which can have a preventative effect and/or can mitigate the progressive degeneration of the animal's joints. Moreover, by providing a balanced (e.g., symmetric or substantially symmetric) input to the muscles of the animal's trunk and hips, the therapeutic garment 100 encourages the proper sequence of muscle firing at the correct times, thereby avoiding compensatory muscle action that can lead to secondary areas of muscle soreness and lameness over time.

Additionally, in the illustrated embodiment, as the animal walks, tension is transmitted through a kinetic chain from the shoulders of the animal to the hips of the animal. The tension is transmitted to the hips of the animal by the ventral and dorsal elastic straps 108, 109, 119, 120, the elastic properties of the therapeutic garment 100, and the attachment of the legs straps 102, 103 to the hind legs of the animal. The tension in the therapeutic garment 100 is configured to stimulate proprioceptors in the animal's trunk muscles and over the animal's hips, which is configured to aid in activating increased muscular activity in these areas. In one or more embodiments, the dorsal elastic straps 119, 120 and the ventral elastic straps 108, 109 are each configured to supply a tensile force of at least 1 N (e.g., in a range from approximately 1 N to approximately 30 N, such as a range from approximately 1 N to approximately 18 N) depending, for instance, on the size and breed of the animal and/or the severity of the medical condition afflicting the animal. In this manner, the therapeutic garment 100 is configured to mitigate against atrophy of muscles (e.g., the gluteal muscles, the iliopsoas, the gemelli, the quadratus femoris, and the internal and external obturator muscles) that that help seat the femoral head in the acetabulum of the coxofemoral joint. Additionally, in the illustrated embodiment, the ventral and dorsal elastic straps 108, 109, 119, 120 are configured to provide targeted (e.g., directed) tension through the animal's trunk muscles to an opposing hip of the animal, which provides proprioceptive stimulation to targeted muscle groups (e.g., illoposoas, epaxial muscles along the spine, and the gluteals) and thereby provides dynamic stability to the coxofemoral joints as the animal stands and moves. As described above, the targeted tension supplied by the ventral and dorsal elastic straps 108, 109, 119, 120 is configured to assist in more deeply seating the femoral heads into the acetabulums of the animal's coxofemoral joints without restricting the animal's natural movement, which facilitates a more normalized firing pattern of the animal's hip muscles. Furthermore, as the animal walks, the leg straps 102, 103 of the therapeutic garment 100 are configured to stimulate the hind limb of the animal that is on the ground as the animal's opposing front limb of the animal is moving forward (e.g., the left leg strap 102 is configured to stimulate the left hind leg of the animal as the animal's right front leg moves forward, and the right leg strap 103 is configured to stimulate the right hind leg of the animal as the animal's left front leg moves forward). Additionally, in the illustrated embodiment, the leg straps 102, 103 are configured to aid in distributing the tensile force supplied to the animal over a relatively wide area. For instance, in one or more embodiments, the leg straps 102, 103 are configured to distribute the tensile force over a maximum area of the animal's hind legs without interfering with the natural movement of the animal's hip or stifle (i.e., knee) joints.

In one or more embodiments, one or more inner surfaces of the therapeutic garment 100 may include small, soft, tacky bumps configured to provide additional neuromuscular stimulation to the animal, such as at acupressure points of the animal to assist with pain relief by providing sensory input as the bumps rub on the animal's skin as the animal moves. Additionally, in one or more embodiments, the therapeutic garment 100 may include one or more pockets (e.g., one or more pockets sewn to the exterior surface 121 of the body portion 101 of the therapeutic garment 100) to hold therapeutic modalities (e.g., hot or cold packs) and/or other devices to treat pain.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof. Although relative terms such as "dorsal," "ventral," "cranial," "caudal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A therapeutic garment for an animal, the therapeutic garment comprising:
    a body portion having a cranial end and a caudal end opposite the cranial end;
    first and second leg straps extending caudally from the caudal end of the body portion;
    a chest plate portion extending cranially from the cranial end of the body portion;
    an opening defined at the cranial end of the body portion configured to accommodate a head of the animal;
    first and second ventral elastic straps connected to an exterior surface of the chest plate portion;
    first and second dorsal elastic straps connected to an exterior surface of the body portion; and
    at least one rear fastener proximate to the caudal end of the body portion,
    wherein the first and second leg straps, the first and second ventral elastic straps, and the first and second dorsal elastic straps are each configured to be detachably connected to the at least one fastener proximate to the caudal end of the body portion.

2. The therapeutic garment of claim 1, wherein each of the body portion, the chest plate portion, and the first and second leg straps have a first resiliency, and wherein each of the first and second dorsal elastic straps and the first and second ventral elastic straps have at least a second resiliency greater than the first resiliency.

3. The therapeutic garment of claim 1, further comprising a plurality of discrete nonslip pads connected to an interior surface of the therapeutic garment.

4. The therapeutic garment of claim 3, wherein the plurality of discrete nonslip pads comprises:
    a first nonslip pad, connected to an interior surface of the chest plate portion;
    a second nonslip pad, connected to an interior surface of the body portion proximate to the cranial end;

a third nonslip pad, connected to the interior surface of the body portion proximate to the caudal end; and fourth and fifth nonslip pads, connected to respective interior surfaces of the first and second leg straps.

5. The therapeutic garment of claim 3, wherein at least one nonslip pad of the plurality of discrete nonslip pads comprises a composite of an open-celled, elastomeric foam and a fabric.

6. The therapeutic garment of claim 1, wherein:
the at least one fastener comprises one of a pad of hook-type fasteners and a pad of loop-type fasteners, and
each of the first and second leg straps, the first and second ventral elastic straps, and the first and second dorsal elastic straps comprises the other one of the pad of loop-type fasteners and the pad of hook-type fasteners.

7. The therapeutic garment of claim 1, wherein the first and second dorsal elastic straps extend toward contralateral sides of the body portion.

8. The therapeutic garment of claim 7, wherein the first and second dorsal elastic straps cross each other.

9. The therapeutic garment of claim 8, further comprising first and second fabric tunnels connected to the exterior surface of the body portion, and wherein the first and second fabric tunnels guide respective cranial ends of the first and second dorsal elastic straps.

10. The therapeutic garment of claim 9, wherein the chest plate portion comprises a pair of opposing flaps.

11. The therapeutic garment of claim 10, further comprising first and second fasteners at first and second lateral sides of the exterior surface of the body portion, wherein the pair of opposing flaps of the chest plate portion are configured to be detachably connected to the first and second fasteners.

12. The therapeutic garment of claim 1, wherein the body portion and the chest plate portion each comprise an omnidirectional resilient and elastic fabric.

13. The therapeutic garment of claim 1, further comprising an elastic binding coupled to a periphery of the body portion, the chest plate portion, and the leg straps.

14. A method of providing therapeutic support to a canine having hip dysplasia, the method comprising:
attaching a therapeutic garment to the canine, the therapeutic garment comprising a body portion, first and second leg straps extending from a caudal end of the body portion, a chest plate portion extending from a cranial end of the body portion, first and second ventral elastic straps connected to an exterior surface of the chest plate portion, first and second dorsal elastic straps connected to an exterior surface of the body portion, and at least one rear fastener proximate to the caudal end of the body portion;
supplying a dorsally and medially-directed force on the canine from each of the first and second dorsal elastic straps; and
supplying a ventrally and medially-directed force on the canine from each of the first and second ventral elastic straps.

15. The method of claim 14, wherein the attaching the therapeutic garment to the canine comprises:

slipping the therapeutic garment over a head of the canine;
attaching the chest plate portion to the body portion, the chest plate portion covering at least a portion of a thorax of the canine;
attaching the first and second dorsal elastic straps to contralateral sides of the at least one rear fastener;
attaching the first and second ventral elastic straps to the at least one rear fastener; and
wrapping the first and second leg straps around respective rear legs of the canine and attaching the first and second leg straps to the at least one rear fastener.

16. The method of claim 14, wherein the dorsally and medially-directed force supplied by each of the first and second elastic straps is substantially balanced by the ventrally and medially-directed force supplied by each of the first and second ventral elastic straps.

17. The method of claim 14, further comprising providing a substantially symmetric and substantially uniform pressure on the canine from a resilient and elastic fabric of the body portion and the chest plate portion.

18. The method of claim 14, further comprising holding the therapeutic garment in a desired anatomical position on the canine with a plurality of discrete nonslip pads connected to an interior surface of the therapeutic garment.

19. A therapeutic garment for an animal, the therapeutic garment comprising:
a body portion having a cranial end and a caudal end opposite the cranial end;
first and second leg straps extending caudally from the caudal end of the body portion;
a chest plate portion extending cranially from the cranial end of the body portion, the chest plate portion being configured to be detachably connected to the body portion;
an opening defined at the cranial end of the body portion configured to accommodate a head of the animal; and
a plurality of discrete nonslip pads connected to an interior surface of the therapeutic garment,
wherein the body portion and the chest plate portion are each configured to create a first amount of friction against the animal, and
wherein at least one nonslip pad of the plurality of nonslip pads is configured to create a second amount of friction against the animal greater than the first amount of friction.

20. The therapeutic garment of claim 19, wherein the plurality of discrete nonslip pads comprises:
a first nonslip pad, connected to an interior surface of the chest plate portion;
a second nonslip pad, connected to an interior surface of the body portion proximate to the cranial end;
a third nonslip pad, connected to the interior surface of the body portion proximate to the caudal end; and
fourth and fifth nonslip pads, connected to respective interior surfaces of the first and second leg straps.

* * * * *